United States Patent
Kawasaki et al.

(10) Patent No.: US 7,515,361 B2
(45) Date of Patent: Apr. 7, 2009

(54) LENS HOLDER AND OPTICAL PICKUP APPARATUS HAVING THE SAME

(75) Inventors: Ryoichi Kawasaki, Gunma (JP); Hiroyuki Shindo, Tokyo (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/681,586

(22) Filed: Mar. 2, 2007

(65) Prior Publication Data

US 2008/0074764 A1    Mar. 27, 2008

(30) Foreign Application Priority Data

Apr. 3, 2006    (JP)    ............................ 2006-101954

(51) Int. Cl.
    *G02B 7/02* (2006.01)
(52) U.S. Cl. .................. 359/811; 359/813; 359/819
(58) Field of Classification Search ............. 359/811, 359/813, 819
    See application file for complete search history.

(56) References Cited

U.S. PATENT DOCUMENTS

| 6,021,107 | A  | * | 2/2000 | Tsukahara et al. | .......... 720/669 |
| 6,895,593 | B2 | * | 5/2005 | Kim et al. | .................. 720/669 |
| 2002/0118470 | A1 | * | 8/2002 | Tsukamoto | ................. 359/813 |
| 2006/0077784 | A1 | * | 4/2006 | Kanaya et al. | ........... 369/44.14 |
| 2006/0136953 | A1 | * | 6/2006 | Kim et al. | .................... 720/683 |

FOREIGN PATENT DOCUMENTS

WO    WO98/02874    1/1998

* cited by examiner

*Primary Examiner*—Jordan M. Schwartz
*Assistant Examiner*—James C Jones
(74) *Attorney, Agent, or Firm*—Fish & Richardson P.C.

(57) ABSTRACT

A lens holder is disclosed which holds a plurality of objective lenses, the lens holder holding the plurality of objective lenses so as to be arranged with a composite gravity center position of the plurality of objective lenses matching a gravity center position of the entire lens holder without the plurality of objective lenses.

9 Claims, 8 Drawing Sheets

LENS HOLDER AND OPTICAL PICKUP APPARATUS HAVING THE SAME

CROSS-REFERENCE TO RELATED APPLICATION

This application claims the benefit of priority to Japanese Patent Application No. 2006-101954, filed Apr. 3, 2006, of which full contents are incorporated herein by reference.

BACKGROUND OF THE INVENTION

1. Technical Field

The present invention relates to a lens holder and an optical pickup apparatus having the lens holder.

2. Description of the Related Art

Conventionally, widespread optical discs used for optically recording/reproducing information with an optical pickup apparatus include a CD medium using "780 to 790 nm" AlGaAs infrared laser for recording/reproducing and a DVD medium using "650 to 660 nm" AlGaInP red laser for recording/reproducing. As a result of widespread use, a general user has the CD medium and the DVD medium using laser lights with different wavelengths in hand, and therefore a CD/DVD compatible optical pickup apparatus is in widespread use to improve the level of convenience for a general user.

An important part of the CD/DVD compatible optical pickup apparatus is an optical system, especially, an objective lens responsible for forming a minute spot of laser light on the CD/DVD medium, and a wide variety of development is performed with a focus on the objective lens. For example, in a proposed mode, a CD medium objective lens and a DVD medium objective lens are disposed correspondingly to two laser lights in conformity with the CD/DVD standards in a CD/DVD compatible optical pickup apparatus and are switched depending on the CD/DVD medium placed on a turntable. And, in another proposed mode, one special objective lens compatible with both CD and DVD is disposed, which has a diffraction lens structure formed on an aspheric surface so as to correct spherical aberration caused by a difference between thicknesses of the protective layers of the CD/DVD medium.

Regarding the CD medium objective lens, the DVD medium objective lens, and the special objective lens compatible with CD/DVD, a single plastic lens is mainstream, which is advantageous in that the lens is lightweight, excellent in mass productivity, and has a higher degree of freedom of size/shape, as compared to a glass lens. By plastic molding, it is possible to design the CD medium objective lens and the DVD medium objective lens to be substantially the same in size/shape and in weight.

In the case of the mode of switching the CD medium objective lens and the DVD medium objective lens, a drive mechanism is needed, which performs complex feed control such that a optical axis of the CD/DVD medium objective lens corresponding to the placed medium is located on a geometric center line of the placed medium in every time the CD/DVD medium is placed on the turntable. Therefore, to eliminate such a complex drive mechanism, a method of disposing the CD/DVD medium objective lens in a lens holder (also known as optical pickup bobbin), is devised in some proposed technologies, wherein the lens holder is one of the components of the optical pickup apparatus.

Figure 8A:
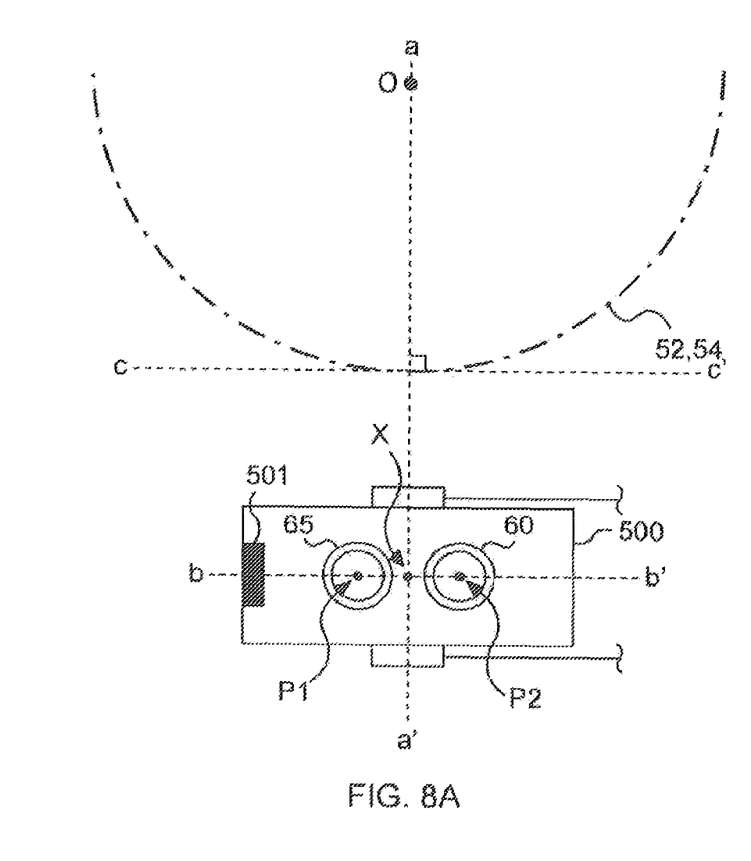
FIGS. 8A and 8B are explanatory view of a layout method of the CD/DVD medium objective lenses in the lens holder.

For example, in the description of International Publication Pamphlet No. WO98/02874, as shown in FIG. 8A, a first objective lens 65 (e.g., CD medium objective lens) and a second objective lens 60 (e.g., DVD medium objective lens) are disposed in a lens holder 500, such that a line b-b' linking between the optical axis P1 and the optical axis P2 becomes parallel to a tangent line c-c' of an information track formed concentrically or spirally with a rotation center O as a base point on a surface of any one of different optical discs (52, 54) mounted on a turntable (not shown). As a result, the configuration of the optical pickup apparatus can be simplified, since the first objective lens 65 and the second objective lens 60 are driven in a focusing direction and a tracking direction by a common drive mechanism without switching a reference position.

Figure 8B:
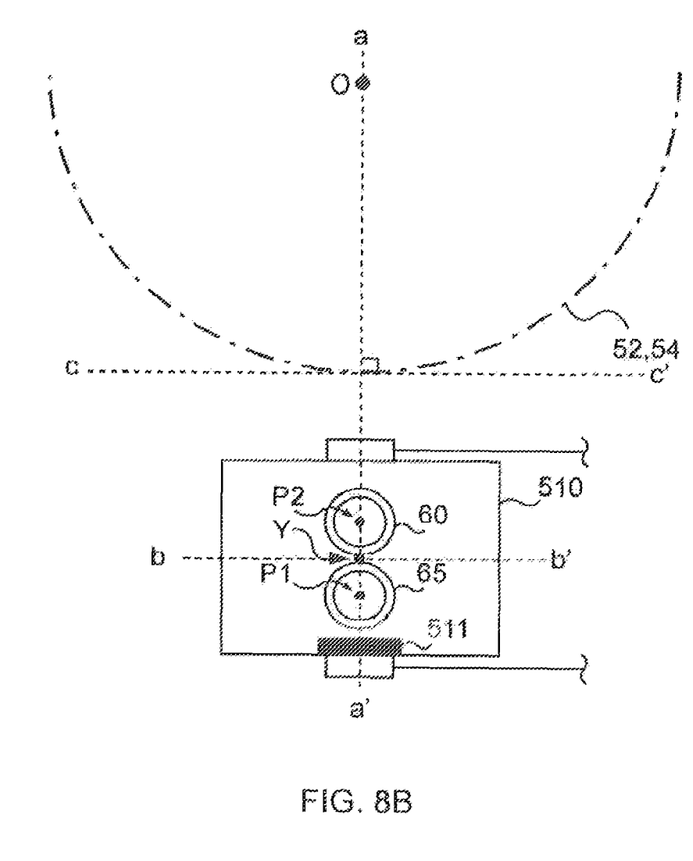

In patent document 1 shown later, as shown in FIG. 8B, the first objective lens 65 and the second objective lens 60 are disposed in a lens holder 510 such that the optical axes P1, P2 are located on a line a-a' passing through the rotation center O on a surface of any one of different optical discs (52, 54) mounted on a turntable. As a result, in either case of using the objective lenses 65 or 60, the information track can be highly accurately scanned with a light.

By the way, recently, a Blu-ray medium (hereinafter, referred to as BD medium) and an HD-DVD medium (hereinafter, referred to as HD medium) have been coming into practical use, which uses InGaN blue purple laser with a wavelength of "400 to 410 nm" for recording/reproducing. Therefore, an optical pickup apparatus has been developed, which has compatibility with the BD medium and/or HD medium in addition to that with the conventional CD medium and DVD medium. The following will be described on the premise that the optical pickup apparatus as mentioned above is exemplified by an optical pickup apparatus compatible with the BD medium, the CD medium, and the DVD medium (hereinafter, referred to as BD/CD/DVD compatible optical pickup apparatus).

With respect to the BD/CD/DVD compatible optical pickup apparatus, the optical system thereof must further be simplified in comparison with that of the CD/DVD compatible optical pickup apparatus since an optical system for the BD medium must newly be added, and the mode of disposing one special objective lens compatible with CD/DVD may be employed rather than the mode of disposing a CD medium objective lens and a DVD medium objective lens. As described above, a single "plastic lens" is mainstream regarding the special objective lens compatible with CD/DVD.

Since the BD medium objective lens (numerical aperture NA 0.85) has a high numerical aperture as compared to the CD medium objective lens (numerical aperture NA 0.45) and the DVD medium objective lens (numerical aperture NA 0.60), the BD/CD/DVD compatible optical pickup apparatus may employ a double lens including a combination of two plastic lenses or a single glass lens for ensuring a range of a working distance. However, since the manufacturing cost of the double lens is high and the working distance between the BD medium and the objective lens is as narrow as "0.15 mm", the single "glass lens" is mainly employed to solve these problems. Currently, the practical use of the BD medium objective lens employing a single plastic lens is not yet within sight.

Therefore, it is conceivable that the mode in which the BD/CD/DVD compatible optical pickup apparatus employs the "glass lens" for the BD medium objective lens and the "plastic lens" for the CD/DVD compatible special objective lens will be mainstream in the future.

By the way, as shown in FIGS. 8A and 8B, in the case that the first objective lens 65 and the second objective lens 60 are substantially the same in size/shape and weight, the balance of the gravity centers can be easily maintained in the lens holders 500, 510 by arranging the first objective lens 65 and the second objective lens 60 symmetrically to the geometric centers X, Y of the lens holders 500, 510.

For example, in the case that the optical pickup apparatus covered by FIGS. 8A and 8B is the CD/DVD compatible optical pickup apparatus and also in the case that the first objective lens 65 is the CD medium objective lens and the second objective lens 60 is the DVD medium objective lens, the single plastic lenses which are substantially the same in size/shape and weight are mainly employed for the first objective lens 65 and the second objective lens 60. Accordingly, the balance of the gravity centers can be easily maintained in the lens holders 500, 510.

On the other hand, for example, in the case that the optical pickup apparatus covered by FIGS. 8A and 8B is the BD/CD/DVD compatible optical pickup apparatus and also in the case that the first objective lens 65 is the BD medium objective lens, i.e., a glass lens, and the second objective lens 60 is the CD/DVD medium objective lens, i.e., a plastic lens, the lens holder 500, 510 may have a problem that the balance of the gravity centers thereof is disrupted easily, when disposed with the first objective lens 65 and the second objective lens 60 as shown in FIGS. 8A and 8B. This is because the specific gravity of the glass lens is higher than that of the plastic lens and therefore the glass lens is twice or more heavier than the plastic lens even if the sizes/shapes thereof are substantially the same.

Due to the above, unnecessary resonances such as pitching and rolling are generated, and for this reason, balancers 501, 511 must be added in the direction of the first objective lens 65 and the second objective lens 60 disposed as shown in FIGS. 8A and 8B. When added with the balancers 501, 511, however, an objective lens drive apparatus 8 becomes heavier, which results in the difficulty of ensuring sensitivity to the drive mechanism. Since the number of components is increased by the number of those of the balancers 501, 511, a discrepancy between the drive point and the gravity center of the objective lens drive apparatus 8 is likely to be generated due to an error in weight and mounting position of each component, which results in a problem that unnecessary resonances may easily be generated.

SUMMARY OF THE INVENTION

To solve the above problems, the main aspect of the present invention provides a lens holder holding a plurality of objective lenses, the lens holder holding the plurality of objective lenses so as to be arranged with a composite gravity center position of the plurality of objective lenses matching a gravity center position of the entire lens holder without the plurality of objective lenses.

Other features of the present invention will become apparent from the content of this description when taken in conjunction with the accompanying drawings.

BRIEF DESCRIPTION OF THE DRAWINGS

To understand the present invention and the advantages thereof more thoroughly, the following description should be referenced in conjunction with the accompanying drawings.

DETAILED DESCRIPTION OF THE INVENTION

From the contents of this description and the accompanying drawings, at least the following details will become apparent.

Overall Configuration of Optical Pickup Apparatus

Figure 1:
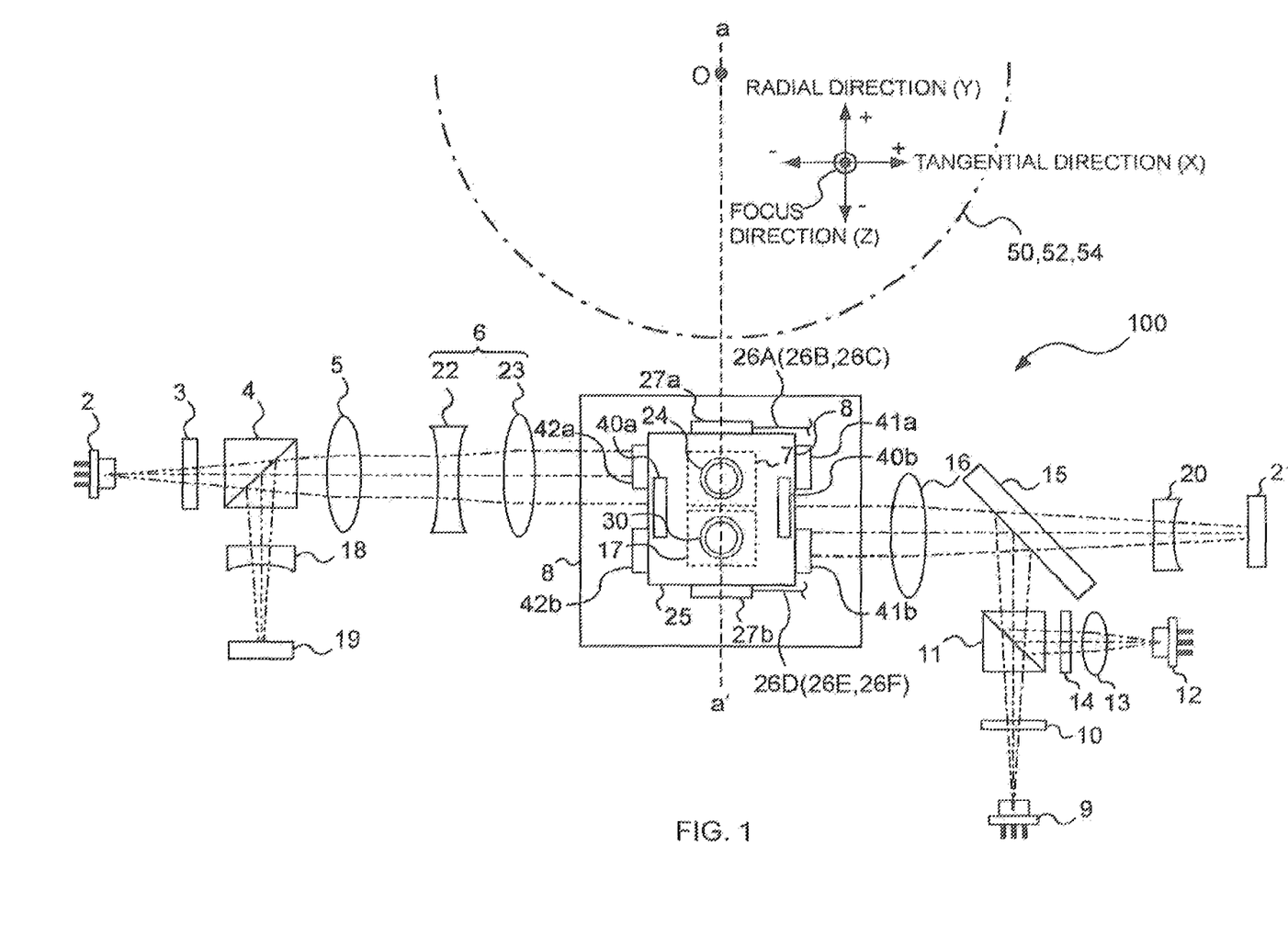
FIG. 1 depicts an overall configuration of an optical pickup apparatus, according to an embodiment of the present invention.
Figure 2A:
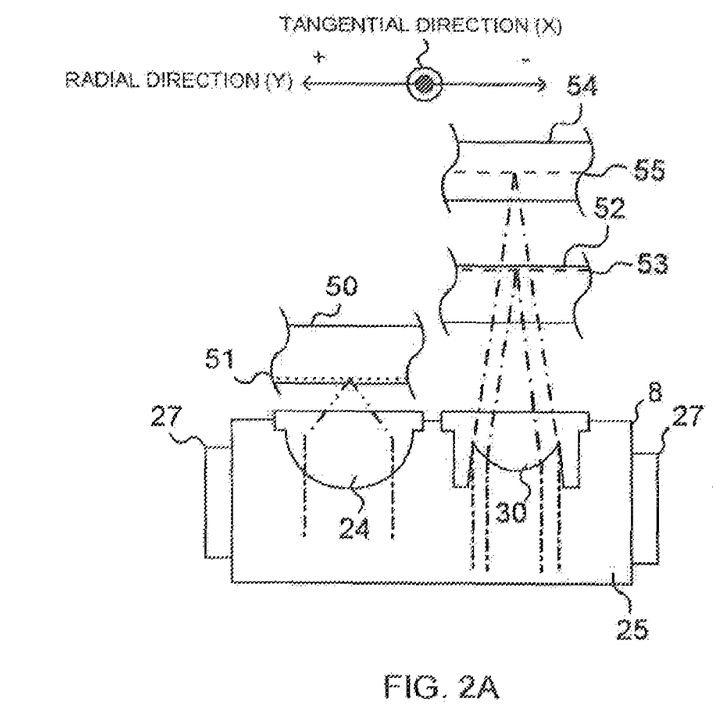
FIGS. 2A and 2B are section views of a lens holder taken along a line a-a', according to an embodiment of the present invention.
Figure 2B:
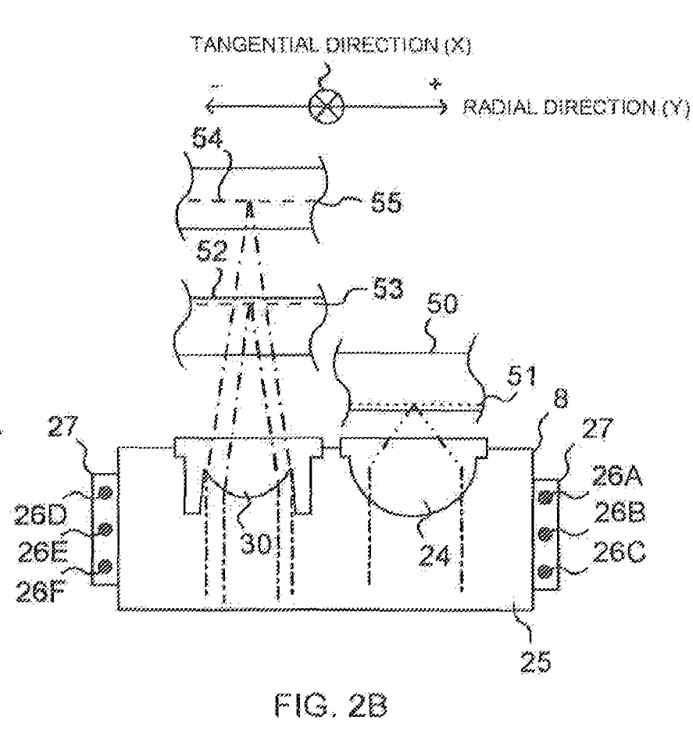
Figure 3:
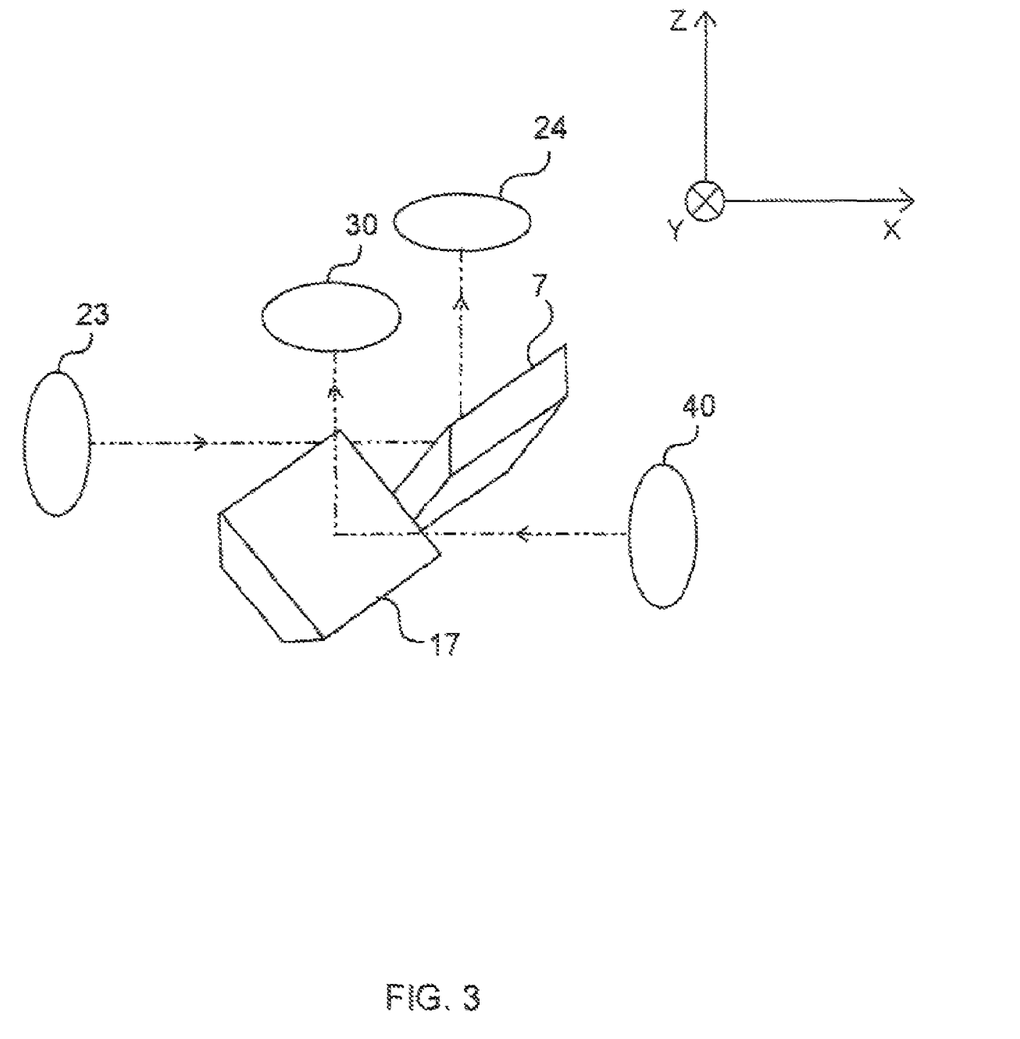
FIG. 3 is a diagram illustrating schematically a positional relation ship between a first objective lens and a rising mirror, and a positional relation ship between a second objective lens and a rising mirror, according to an embodiment of the present invention.

An overall configuration of an optical pickup apparatus 100 according to an embodiment of the present invention will be described with reference to FIGS. 1, 2, and 3. FIG. 1 depicts an overall configuration of an optical pickup apparatus, according to an embodiment of the present invention. FIGS. 2A and 2B are section views taken along a line a-a' shown in FIG. 1. FIG. 3 is a diagram illustrating schematically a positional relation ship between an objective lens and a rising mirror, according to an embodiment of the present invention.

The optical pickup apparatus 100 is assumed to be a BD/CD/DVD compatible optical pickup apparatus that is compatible with a Blu-ray medium (hereinafter, referred to as BD medium) 50 in conformity with the Blu-ray standard ("first optical disc standard" according to the present invention), a CD medium 52 in conformity with the CD standard ("second optical disc standard" according to the present invention), and a DVD medium 54 in conformity with the DVD standard ("second optical disc standard" according to the present invention).

In this case, the optical pickup apparatus 100 includes a blue-violet semiconductor laser 2, diffraction gratings 3, 10, 14, a beam splitter 4, collimator lenses 5, 16, a beam expander 6, rising mirrors 7, 17, an objective lens drive apparatus 8, a red semiconductor laser 9, a dichroic prism 11, an infrared semiconductor laser 12, a coupling lens 13, a plate beam splitter 15, sensor lenses 18, 20, and photodetectors 19, 21.

<Optical System for BD Medium>

The blue-violet semiconductor laser 2 includes a diode (not shown) formed by the P-N junction of a p-type semiconductor and an n-type semiconductor, for example. The blue-violet semiconductor laser 2 emits a blue-violet laser light ("first laser light in conformity with a first optical disc standard") by applying a control voltage from a laser drive circuit not shown, wherein the blue-violet laser light has a wavelength (400 to 410 nm) corresponding to a thickness (0.075 to 0.1 mm) of a protective layer from one surface facing a first objective lens 24 to an information surface 51 in the BD medium 50.

The diffraction grating 3 diffracts the blue-violet laser light to generate and emit, for example, zeroth-order light and plus/minus first-order diffracted light to the beam splitter 4. In this embodiment, the zeroth-order light and the plus/minus first diffracted-order light are referred to as the blue-violet laser light in the following description unless otherwise designated.

The beam splitter 4 allows the blue-violet laser light to pass therethrough into the collimator lens 5. The beam splitter 4 reflects the reflected blue-violet laser light emitted from the collimator lens 5 into the sensor lens 18, wherein the blue-violet laser light is applied to and reflected from the information surface 51 of the BD medium 50.

The collimator lens 5 converts the blue-violet laser light into parallel light, which in turn enters the beam expander 6. The collimator lens 5 converts the reflected light of the blue-violet laser light from the beam expander 6 into convergent light, which in turn enters the beam splitter 4.

The beam expander 6 includes a concave lens 22 and a convex lens 23.

The concave lens 22 converts the blue-violet laser light into diffusion light, which in turn enters the convex lens 23. The convex lens 23 converts the blue-violet laser light into parallel light, which is emitted in turn. As a result, the beam expander 6 expands the blue-violet laser light from the collimator lens 5 with an expansion rate corresponding to a distance between the concave lens 22 and the convex lens 23, and the expanded laser light is emitted to a rising mirror (not shown) of the objective lens drive apparatus 8. The blue-violet laser light is expanded by the beam expander 6 to correct spherical aberration. When the BD medium 50 includes, e.g., two layers of information surface (not shown), a difference between the thicknesses relevant to the two layers causes the generation of the above spherical aberration.

The convex lens 23 converts the reflected light of the blue-violet laser light from the rising mirror 7 of the objective lens drive apparatus 9 into convergent light, which in turn enters the concave lens 22. The concave lens 22 converts the reflected light of the blue-violet laser light into parallel light, which is emitted in turn. As a result, the beam expander 6 contracts the reflected light of the blue-violet laser light from the rising mirror 7 with an contraction rate corresponding to a distance between the concave lens 22 and the convex lens 23, and the contracted laser light is emitted to the collimator lens 5.

The rising mirror 7 reflects the blue-violet laser light into the first objective lens 24 of the objective lens drive apparatus 8. The rising mirror 7 reflects the reflected light of the blue-violet laser light from the objective lens drive apparatus 8 to emit the light to the beam expander 6.

The sensor lens 18 adds astigmatism to the reflected light of the blue-violet laser light from the beam splitter 4 and emits the light to the photodetector 19 to perform focusing control based on the differential astigmatic method, for example.

The photodetector 19 includes photoreception areas for receiving the reflected light of the zeroth-order light and the reflected light of the plus/minus first-order diffracted light, which are the reflected light of the blue-violet laser light. The photodetector 19 generates an electric signal formed by photoelectric conversion in response to the light amount of the reflected light of the zeroth-order light and outputs the electric signal to a process circuit (not shown) which follows the photodetector 19. As a result, based on the electric signal corresponding to the reflected light of the zeroth-order light, information is reproduced from the information surface 51 of the BD medium 50.

The photodetector 19 also generates an electric signal formed by photoelectric conversion in response to the light amount of the reflected light of the plus/minus first-order diffracted light and outputs the generated electric signal along with the electric signal corresponding to the reflected light of the zeroth-order light, to a servo control circuit (not shown) which follows the photodetector 19. As a result, a tracking control signal, a focusing control signal, etc. are generated based on the electric signals corresponding to the reflected light of the zeroth-order light and of the plus/minus first-order diffracted light to perform the tracking control, focusing control, etc., via the above magnetic member.

<Optical System for CD/DVD Medium>

The red semiconductor laser 9 includes a diode (not shown) formed by the P-N junction of a p-type semiconductor and an n-type semiconductor, for example. The red semiconductor laser 9 emits a red laser light ("second laser light in conformity with a second optical disc standard") by applying a control voltage from a laser drive circuit not shown, wherein the red laser light has a wavelength (650 to 660 nm) corresponding to a thickness (0.6 mm) of a protective layer from one surface facing a second objective lens 30 to an information surface 55 of the DVD medium 54.

The diffraction grating 10 diffracts the red laser light to generate and emit, for example, zeroth-order light and plus/minus first-order diffracted light to the dichroic prism 11. In this embodiment, the zeroth-order light and the plus/minus first-order diffracted light are referred to as the "red laser light".

The infrared semiconductor laser 12 includes a diode (not shown) formed by the P-N junction of a p-type semiconductor and an n-type semiconductor, for example. The infrared semiconductor laser 12 emits an infrared laser light ("second laser light in conformity with a second optical disc standard") by applying a control voltage from a laser drive circuit not shown, wherein the infrared laser light has a wavelength (780 to 790 nm) corresponding to a thickness (1.2 mm) of a protective layer from one surface facing the second objective lens 30 to an information surface 53 of the CD medium 52.

The coupling lens 13 converts a spread angle of the infrared laser light that is diffused light, and emits the light to the diffraction grating 14.

The diffraction grating 14 diffracts the infrared laser light to generate and emit, for example, zeroth-order light and plus/minus first-order diffracted light to the dichroic prism 11. In this embodiment, the zeroth-order light and the plus/minus first-order diffracted light are referred to as the "infrared laser light".

the dichroic prism 11 allows the red laser light to pass therethrough into the plate beam splitter 15. The dichroic prism 11 reflects the infrared laser light into the plate beam splitter 15. The plate beam splitter 15 reflects the red laser light and the infrared laser light into the collimator lens 16. The plate beam splitter 15 allows the reflected red laser light and the reflected infrared laser light, which are both emitted from the collimator lens 16, to pass therethrough into the sensor lens 20, wherein the red laser light is applied to and reflected from the information surface 55 of the DVD medium 54, and wherein the infrared laser light is applied to and reflected from the information surface 53 of the CD medium 52.

The collimator lens 16 converts the red laser light and the infrared laser light into parallel light, which is in turn emitted to the rising mirror 17. The collimator lens 16 converts the reflected red laser light and the reflected infrared laser light from the rising mirror 17 into convergent light, which in turn enter the plate beam splitter 15.

The rising mirror 17 reflects the red laser light and the infrared laser light into the second objective lens 30 of the objective lens drive apparatus 8. The rising mirror 17 also reflects the reflected light of the red laser light and of the infrared laser light from the objective lens drive apparatus 8 to emit the light into the collimator 16.

The sensor lens 20 adds astigmatism to the reflected light of the red laser light and of the infrared laser light from the plate light splitter 15 and emits the light to the photodetector 21 to perform focusing control based on the differential astigmatic method, for example.

The photodetector 21 includes photoreception areas for receiving the reflected light of the zeroth-order light and the reflected light of the plus/minus first-order diffracted light, which are the reflected light of the red laser light and of the infrared laser light. The photodetector 21 generates an electric signal formed by photoelectric conversion in response to the light amount of the reflected light of the zeroth-order light and outputs the electric signal to a process circuit (not shown) which follows the photodetector 21. As a result, based on the electric signal corresponding to the reflected light of the zeroth-order light (red laser light), information is reproduced from the information surface 55 of the DVD medium 54. Based on the electric signal corresponding to the reflected light of the zeroth-order light (infrared laser light), information is reproduced from the information surface 53 of the CD medium 52.

The photodetector 21 also generates an electric signal formed by photoelectric conversion in response to the light amount of the reflected light of the plus/minus first-order diffracted light and outputs the generated electric signal along with the electric signal corresponding to the reflected light of the zeroth-order light, to a servo control circuit (not shown) which follows the photodetector 21. As a result, a tracking control signal, a focusing control signal, etc., are generated based on the electric signals corresponding to the reflected lights of the zeroth-order light and the plus/minus first-order diffracted light to perform the tracking control, focusing control, etc., via the above magnetic member.

<Objective Lens Drive Apparatus>

The objective lens drive apparatus 8 at least includes the first objective lens 24, the second objective lens 30, focusing coils 40a, 40b, tracking coils 41a, 41b, 42a, 42b, a lens holder 25, wires 26A to 26F, and a wire holding member 27. Other members (magnet, yoke, etc.) of the objective lens drive apparatus 8 may be those shown in FIGS. 1 and 2 of Japanese Patent Application Laid-Open Publication Nos. 2002-367199, for example.

The first objective lens 24 is a single glass lens having numerical aperture NA (0.85) corresponding to the thickness of the protective layer of the BD medium 50. The first objective lens 24 condenses the blue-violet laser light from the rising mirror 7 on the information surface 51 of the BD medium 50. The first objective lens 24 converts the reflected blue-violet laser light into parallel light, which is in turn emitted to the rising mirror 7, wherein the blue-violet laser light is applied to and reflected from the information surface 51 of the BD medium 50.

The second objective lens 30 is a single plastic lens corresponding to both the DVD medium 54 and the CD medium 52. Although the second objective lens 30 has numerical aperture NA (0.6 to 0.65) corresponding to the thickness of the protective layer of the DVD medium 54, a diffraction lens structure is formed on an aspheric surface to correct spherical aberration caused by a difference between thicknesses of the protective layers of the CD/DVD medium 52, 54. As a result, the second objective lens 30 can support both the DVD medium 54 and the CD medium 52.

The second objective lens 30 condenses the red laser light from the rising mirror 17 on the information surface 55 of the DVD medium 54 and condenses the infrared laser light from the rising mirror 17 on the information surface 53 of the CD medium 52. The second objective lens 30 converts the reflected red laser light into parallel light, which is in turn emitted to the rising mirror 17, wherein the red laser light is applied to and reflected from the information surface 54 of the DVD medium 54. The second objective lens 30 also converts the reflected infrared laser light into parallel light, which is in turn emitted to the rising mirror 17, wherein the infrared laser light is applied to and reflected from the information surface 53 of the CD medium 52.

The focusing coils 40a, 40b are drive coils for driving the lens holder 25 in response to a control current in a focusing direction parallel to the optical axes of the first objective lens 24 and the second objective lens 30.

The tracking coils 41a, 41b, 42a, 42b are drive coils for driving in response to a control current in a tracking direction perpendicular to the optical axes of the first objective lens 24 and the second objective lens 30.

The lens holder 25 is one embodiment of a "lens holder" according to the present invention and is used for arranging and holding the first objective lens 24 and the second objective lens 30 with the use of la fixing or fitting means, etc. For example, the lens holder 25 may be a bobbin and etc. that is a circular or polygonal tube forming a coil with an electric wire wound.

The lens holder 25 is integrally formed with wire holding members 27a, 27b that holds one end of the suspension wires 26A to 26F, the other end of which is fixed to an actuator substrate (not shown) that is one of the components of the objective lens drive apparatus 8.

The lens holder 25 is elastically held on the actuator substrate by the elastic force of the suspension wires 26A to 26F. When the focusing coils 40a, 40b and the tracking coils 41a, 41b, 42a, 42b are energized, the lens holder 25 is driven in the direction of tracking, focusing, and etc., by the magnetic actions of magnetic members such as magnets and yokes (not shown) disposed on the actuator substrate.

Arrangement of Objective Lens in Lens Holder

<<Composite Gravity Center Position of First and Second objective Lenses>>

Figure 4:
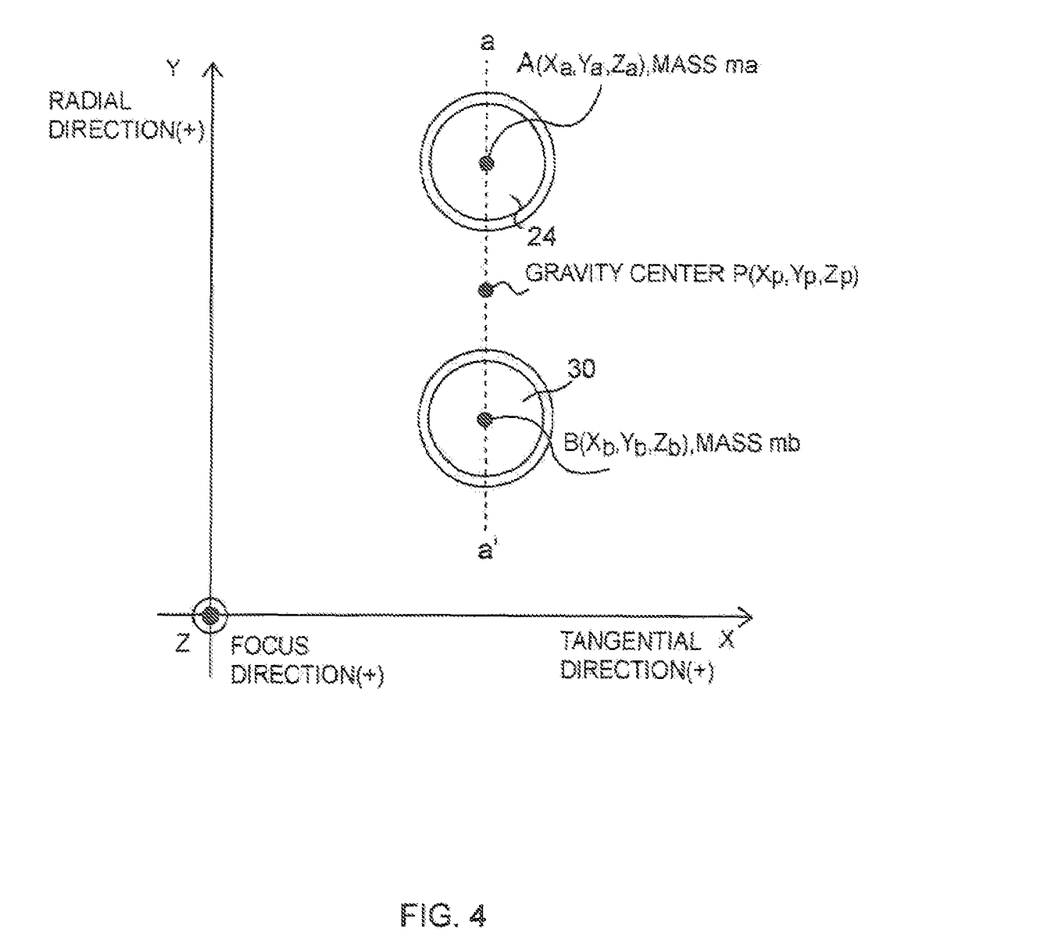
FIG. 4 is an explanatory view of a composite gravity center position of the first and second objective lenses, according to an embodiment of the present invention.

A composite gravity center position P relating to the first and second objective lenses 24, 30 will be described with reference to FIG. 4.

First, a three-dimensional coordinate space is assumed, wherein the X-axis thereof represents the tangential direction, the Y-axis thereof represents the radial direction, and the Z-axis thereof represents the focusing direction. The tangential direction (X-direction) is a direction perpendicular to the optical axes of the first objective lens 24 and the second objective lens 30, as well as a direction tangent with respect to an information track, which is concentrically or spirally formed with a rotation center O as a base point on the BD medium 50, the DVD medium 54, and the CD medium 52. The radial direction (Y-direction) is a direction perpendicular to the optical axes of the first objective lens 24 and the second objective lens 30, as well as a direction radial with respect to the BD medium 50, the DVD medium 54, and the CD medium 52. The focusing direction (Z-direction) is a direction parallel to the optical axes of the first objective lens 24 and the second objective lens 30.

In the three-dimensional coordinate space, it is assumed that the first objective lens 24 has mass $m_a$ and a mass point A of gravity center coordinates $(X_a, Y_a, Z_a)$, and that the second objective lens 24 has mass $m_b$ and a mass point B of gravity center coordinates $(X_b, Y_b, Z_b)$. The composite gravity center position P of the mass points A, B is assumed to be $(X_p, Y_p, Z_p)$.

In the case that the moment in the tangential direction (X-direction) is zero, the following equation (1) is formulated. The acceleration of gravity is represented by g.

$$ma \cdot g \cdot Xa + mb \cdot g \cdot Xb - (ma+mb) \cdot g \cdot Xp = 0 \quad (1)$$

When the equation (1) is modified, the following equation (2) is established.

$$Xp = (ma \cdot Xa + mb \cdot Xb)/(ma+mb) \quad (2)$$

Equation (3) and equation (4) are similarly established for the radial direction (Y-direction) and the focusing direction (Z-direction), respectively.

$$Yp = (ma \cdot Ya + mb \cdot Yb)/(ma+mb) \quad (3)$$

$$Zp = (ma \cdot Za + mb \cdot Zb)/(ma+mb) \quad (4)$$

It is known from equations (2) to (4) that the composite gravity center position P (Xp, Yp, Zp) can be obtained as a weighted average position of the mass ma, mb of two mass points A, B. The composite gravity center position P (Xp, Yp, Zp) of two or more mass points can also be obtained as a weighted average position of the mass points as shown in equations (2) to (4).

<<Gravity Center Position of Lens Holder>>

Figure 5:
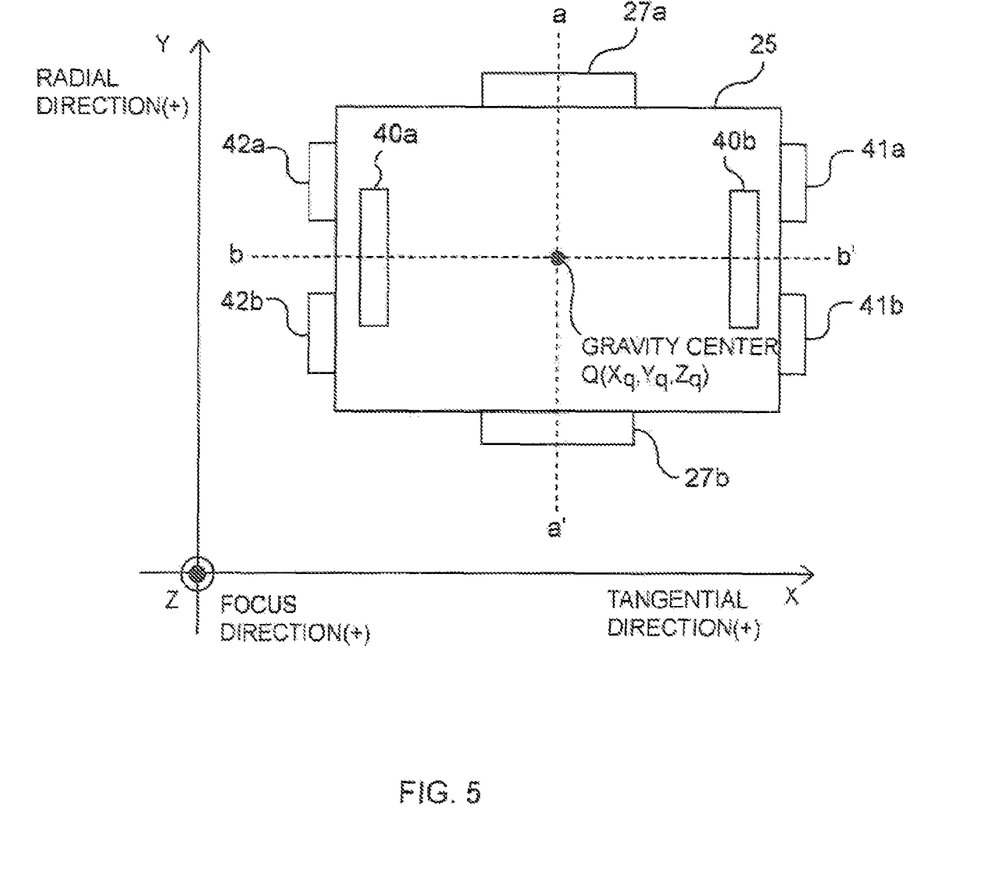
FIG. 5 is an explanatory view of a gravity center position of a lens holder, according to an embodiment of the present invention.

A gravity center position Q (Xq, Yq, Zq) of the lens holder 25 will be described with reference to FIG. 5.

The lens holder 25 at least includes objects that can be considered as mass points, which are the lens holder 25 itself, the focusing coils 40a, 40b, the tracking coils 41a, 41b, 42a, 42b, and the wire holding members 27a, 27b. Therefore, the gravity center position Q (Xq, Yq, Zq) of the lens holder 25 can be obtained by obtaining the weighted average positions of the lens holder 25 itself, the focusing coils 40a, 40b, the tracking coils 41a, 41b, 42a, 42b, and the wire holding members 27a, 27b as shown in the equations (2) to (4).

The focusing coils 40a, 40b have substantially the same size/shape and weight in general, and are symmetrically arranged with respect to the geometric center of the lens holder 25 along the tangential direction (X-direction). The tracking coils 41a, 41b, 42a, 42b have substantially the same size/shape and weight in general, and are point-symmetrically arranged with respect to the geometric center of the lens holder 25. The wire holding members 27a, 27b have substantially the same size/shape and weight in general, and are symmetrically arranged with respect to the geometric center of the lens holder 25 along the radial direction. Accordingly, in this case, the gravity center position Q (Xq, Yq, Zq) of the lens holder 25 can be the geometric center of the lens holder 25 without considering the contribution of focusing coils 40a, 40b, the tracking coils 41a, 41b, 42a, 42b, and the wire holding members 27a, 27b.

<<Arrangement of First and Second Objective Lenses>>

A layout method of the first and second objective lenses 24, 30 in the lens holder 25 will be described with reference to FIG. 6.

The first objective lens 24 and the second objective lens 30 are held with the use of a fixing or fitting means, etc., so as to be arranged with the composite gravity center position P (Xp, Yp, Zp) of the first objective lens 24 and the second objective lens 30 matching the gravity center position Q (Xq, Yq, Zq) of the lens holder 25 located on a line a-a' along the radial direction. As a result, the balance of the gravity centers of the lens holder 25 can be suitably maintained without increasing the number of components such as a balancer. The sensitivity to the drive mechanism can be ensured. The drive point can match the overall gravity position of the movable units of the objective lens drive apparatus 8 (the first and second objective lenses (24, 30), the focusing coils (40a, 40b), the tracking coils (41a, 41b, 42a, 42b), and the wire holding members (27a, 27b)), which results in preventing the generation of unnecessary resonances.

In this case, the first objective lens 24 and the second objective lens 30 are held in the lens holder 25 so as to be arranged with the optical axes P1, P2 thereof being parallel to each other as well as with each of the positions thereof being on the line a-a' passing through the rotation center O in parallel with the radial direction on the surface of any one of the different BD medium 50, DVD medium 54, and CD medium 52 mounted on the turntable. As a result, the composite gravity center position P (Xp, Yp, Zp) can easily be positioned to the gravity center position Q (Xq, Yq, Zq), and the information track can highly accurately be scanned in either case of using the first or second objective lens 24, 30.

Other Embodiments

Although the embodiments of the present invention have been described, the above embodiments are for the purpose of facilitating the understanding of the present invention and not for the purpose of construing the present invention in a limited manner. The present invention may be changed/altered without departing from the spirit thereof and includes the equivalents thereof.

<<Arrangement of First and Second Objective Lenses in Tangential Direction>>

Figure 6:
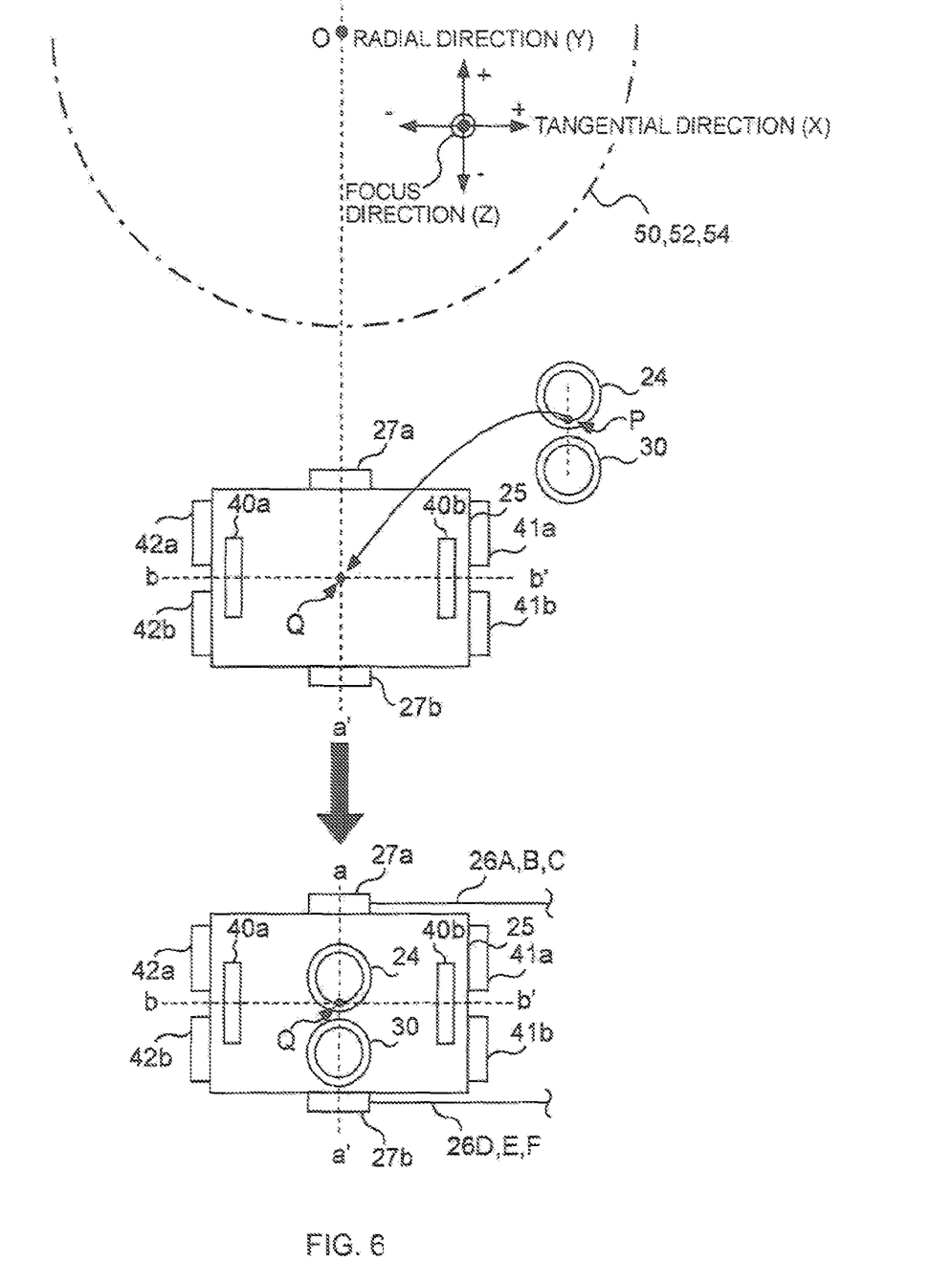
FIG. 6 is an explanatory view of a layout method of the first and second objective lenses in the lens holder, according to an embodiment of the present invention.
Figure 7:
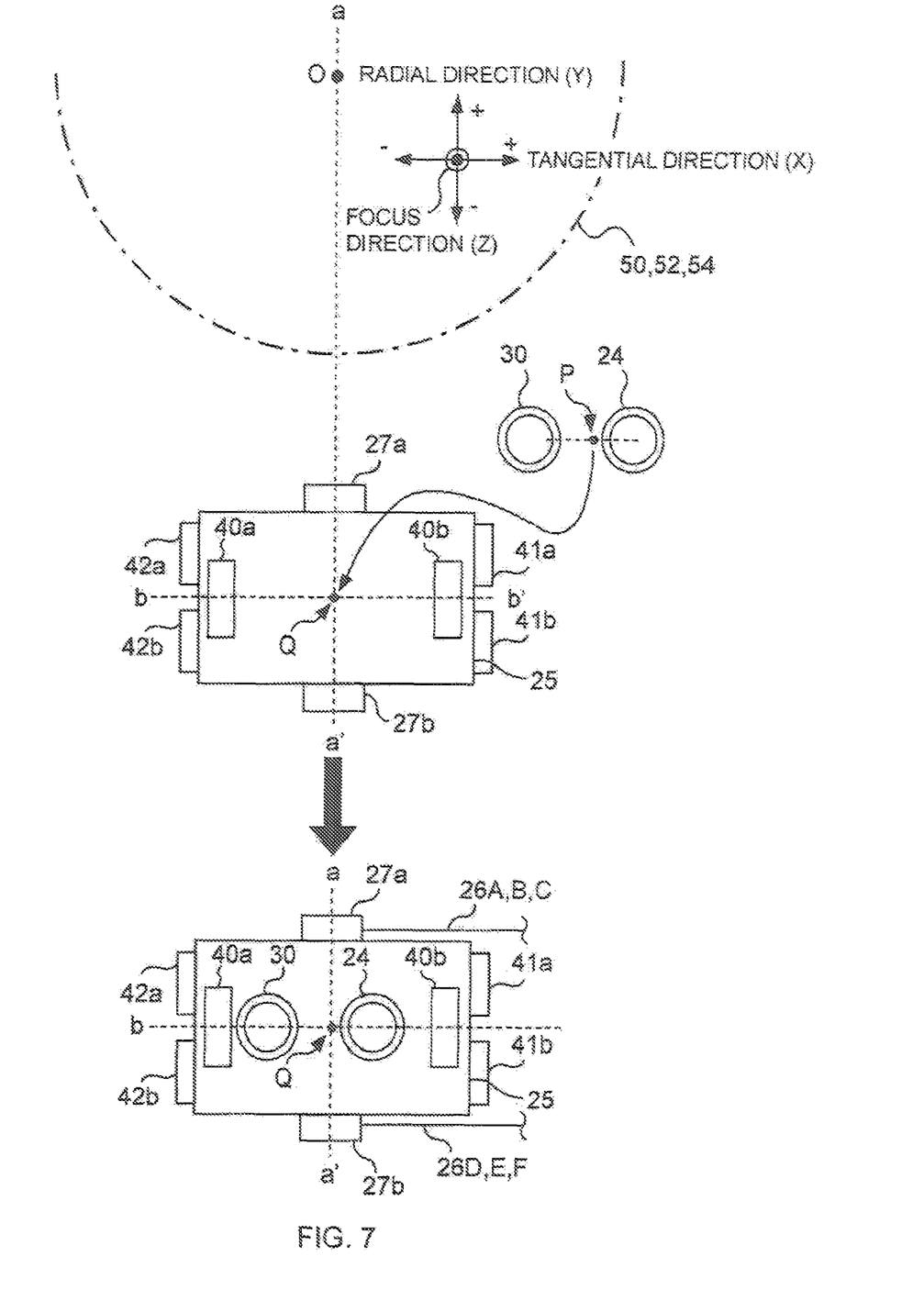
FIG. 7 is an explanatory view of a layout method of the first and second objective lenses in the lens holder, according to another embodiment of the present invention.

Instead of arranging the first and second objective lenses 24, 30 in the lens holder 25 in the radial direction as shown in FIG. 6, the first and second objective lenses 24, 30 may be arranged in the lens holder 25 in the tangential direction as shown in FIG. 7.

Specifically, the first objective lens 24 and the second objective lens 30 are held with the use of a fixing or fitting means, etc., so as to be arranged with the composite gravity center position P (Xp, Yp, Zp) of the first objective lens 24 and the second objective lens 30 matching the gravity center position Q (Xq, Yq, Zq) of the lens holder 25 located on a line b-b' along the tangential direction. As a result, the balance of the gravity centers of the lens holder 25 can be suitably maintained without increasing the number of components such as a balancer.

In this case, the first objective lens 24 and the second objective lens 30 are held in the lens holder 25 so as to be arranged with a line linking the optical axes P1, P2 thereof being parallel to the tangential direction with respect to the information track, which is concentrically or spirally formed around the rotation center O as a central point on a surface of any one of the BD medium 50, DVD medium 54, and CD medium 52 mounted on the turntable. As a result, the composite gravity center position P (Xp, Yp, Zp) can easily be positioned to the gravity center position Q (Xq, Yq, Zq), and at the same time, the configuration of the optical pickup apparatus 100 can be simplified since the first objective lens 65 and the second objective lens 60 are driven in the focusing direction and the tracking direction by a common drive mechanism without switching a reference position.

<<Case of BD/HD Compatible Optical Pickup Apparatus>>

While the first objective lens 24 is the BD medium objective lens as above, the second objective lens 30 may be an objective lens (hereinafter, referred to as HD medium objective lens) that condenses the blue-violet laser light on an optical disc (HD medium) in conformity with the HD-DVD standard. This is because a plastic lens may be employed as the HD medium objective lens since the HD-DVD standard is upwardly compatible with the DVD standard. That is, the present invention may be applied to the BD/HD compatible optical pickup apparatus separately disposed with the BD medium objective lens and the HD medium objective lens. The present invention may also be applied to an optical pickup apparatus compatible with all of the BD, HD-DVD, CD, and DVD standards. This is because the mechanism according to the present invention for maintaining the balance of the gravity centers can work more efficiently with the increasing total number of objective lenses to be held in the lens holder 25.

<<Case of CD/DVD Compatible Optical Pickup Apparatus>>

Moreover, the present invention may be applied to the CD/DVD compatible optical pickup apparatus separately disposed with the CD medium objective lens and the DVD medium objective lens. For example, in this case, the first objective lens 24 is the DVD medium objective lens and the second objective lens 30 is the CD medium objective lens. That is, the first objective lens 24 (DVD medium objective lens) and the second objective lens 30 (CD medium objective lens) may have different weights due to a difference in the numerical aperture NA thereof and the balance of the gravity centers of the lens holder 25 may be disrupted if the objective lenses are simply arranged and held in the lens holder 25.

However, since the first and second objective lenses 24, 30 are held so as to be arranged with the composite gravity center position P (Xp, Yp, Zp) thereof matching the gravity center position Q (Xq, Yq, Zq) of the lens holder 25 in the present invention, the balance of the gravity centers of the lens holder 25 can be maintained even if the weights of the first and second objective lenses 24, 30 are different.

What is claimed is:

1. A lens holder holding a plurality of objective lenses with a composite gravity center position of the plurality of objective lenses matching a gravity center position of the lens holder without the plurality of objective lenses, wherein one of the plurality of objective lenses has a different weight than another of the plurality of objective lenses.

2. The lens holder of claim 1, wherein
when each of the plurality of objective lenses is considered as a mass point, the composite gravity center position is a weighted average position of the mass points.

3. The lens holder of claim 1, comprising:
a drive coil that drives the lens holder by a magnetic action; and
a wire holding member that holds a wire for elastically supporting the lens holder, wherein
when each of:
the lens holder without the drive coil and the wire holding member;
the drive coil; and
the wire holding member is considered as a mass point, the gravity center position is a weighted average position of the mass points.

4. The lens holder of claim 1, wherein
each of the plurality of objective lenses is an objective lens for condensing a laser light on an information surface of an optical disc medium in conformity with a different optical disc standard.

5. The lens holder of claim 4, wherein
one of the plurality of objective lenses is a glass lens and another of the plurality of objective lenses is a plastic lens.

6. A lens holder holding a plurality of objective lenses with a composite gravity center position of the plurality of objective lenses matching a gravity center position of the lens holder without the plurality of objective lenses, wherein
each of the plurality of objective lenses is an objective lens for condensing a laser light on an information surface of an optical disc medium in conformity with a different optical disc standard, and wherein
one of the plurality of objective lenses is a glass lens that is an objective lens for condensing a first laser light in conformity with a first optical disc standard on an information surface of an optical disc medium in conformity with the first optical disc standard, and wherein
another of the plurality of objective lenses is a plastic lens that is an objective lens for condensing a second laser light in conformity with a second optical disc standard on an information surface of an optical disc medium in conformity with the second optical disc standard.

7. The lens holder of claim 4, wherein
the lens holder holds the plurality of objective lenses with the optical axes thereof being parallel to each other and with each of the optical axes thereof being on a line in a predetermined radial direction of the optical disc medium.

8. The lens holder of claim 4, wherein
the lens holder holds the plurality of objective lenses with the optical axes thereof being parallel to each other and with each of the optical axes thereof being on a line parallel to a predetermined tangential direction of an information track formed on an information surface of the optical disc medium.

9. An optical pickup apparatus comprising the lens holder of claim 1.

* * * * *